(12) United States Patent
Gilloteaux et al.

(10) Patent No.: US 10,569,844 B2
(45) Date of Patent: Feb. 25, 2020

(54) FLOATING OFFSHORE WIND TURBINE COMPRISING A COMBINATION OF DAMPING MEANS

(71) Applicant: IFP Energies nouvelles, Rueil-Malmaison (FR)

(72) Inventors: Jean-Christophe Gilloteaux, Rueil Malmaison (FR); Yann Poirette, Reventin-Vaugris (FR); Alice Pourtier, L Isle d Abeau (FR); Pauline Bozonnet, Paris (FR); Gilles Ferrer, Rueil-Malmaison (FR); Gerard Papon, Les Essarts le Roi (FR); Timothee Perdrizet, Lyons (FR); Navid Saeedi, Alfortville (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 435 days.

(21) Appl. No.: 14/891,805

(22) PCT Filed: Mar. 26, 2014

(86) PCT No.: PCT/FR2014/050712
§ 371 (c)(1),
(2) Date: Nov. 17, 2015

(87) PCT Pub. No.: WO2014/184454
PCT Pub. Date: Nov. 20, 2014

(65) Prior Publication Data
US 2016/0101833 A1    Apr. 14, 2016

(30) Foreign Application Priority Data

May 17, 2013  (FR) ...................................... 13 54474

(51) Int. Cl.
*B63B 35/44* (2006.01)
*F03D 1/06* (2006.01)
(Continued)

(52) U.S. Cl.
CPC .............. *B63B 35/44* (2013.01); *B63B 1/048* (2013.01); *B63B 39/06* (2013.01); *F03D 1/06* (2013.01);
(Continued)

(58) Field of Classification Search
CPC ................ B63B 35/44; B63B 35/4406; B63B 2035/4433; B63B 2035/446
(Continued)

(56) References Cited

U.S. PATENT DOCUMENTS

2011/0148115 A1* 6/2011 Roznitsky ............... F03D 13/25
290/44
2012/0243943 A1* 9/2012 Bogl ....................... E02B 17/02
405/205

FOREIGN PATENT DOCUMENTS

| FR | 2970938 A1 * | 8/2012 | ............. B63B 1/107 |
| WO | 03/004869 | 1/2003 | |
| WO | 2012/169914 | 12/2012 | |

OTHER PUBLICATIONS

PCT Search Report in PCT/FR2014/050712 dated May 17, 2013.

* cited by examiner

*Primary Examiner* — Dwayne J White
*Assistant Examiner* — Jason Mikus
(74) *Attorney, Agent, or Firm* — Fitch, Even, Tabin & Flannery LLP

(57) ABSTRACT

The present invention relates to an offshore wind turbine on a floating support structure (1) comprising in combination: a main floater (1) comprising a part of substantially cylin-
(Continued)

drical shape, a concrete circular element (2) having a diameter greater than the diameter of the main floater, providing a stationary mass at the base of the floater and a damper, supplementary permanent ballast (4) arranged at the base of the main floater, dynamic ballast boxes (3) included in the main floater and distributed ringwise on the periphery of the floater.

22 Claims, 3 Drawing Sheets

(51) Int. Cl.
    *F03D 3/00*     (2006.01)
    *F03D 13/25*     (2016.01)
    *B63B 39/06*     (2006.01)
    *B63B 1/04*     (2006.01)

(52) U.S. Cl.
    CPC .............. *F03D 3/005* (2013.01); *F03D 13/25* (2016.05); *B63B 2001/044* (2013.01); *B63B 2035/446* (2013.01); *B63B 2039/067* (2013.01); *F05B 2240/93* (2013.01); *Y02E 10/721* (2013.01); *Y02E 10/727* (2013.01)

(58) Field of Classification Search
    USPC .......................................................... 416/85
    See application file for complete search history.

FLOATING OFFSHORE WIND TURBINE COMPRISING A COMBINATION OF DAMPING MEANS

CROSS REFERENCE TO RELATED APPLICATIONS

Reference is made to PCT Patent Application No. PCT/FR2014/050712 and French Patent application Ser. No. 13/54,474 which applications are incorporated herein by reference in their entirety.

BACKGROUND OF THE INVENTION

Field of the Invention

The present invention relates to offshore wind turbines and in particular wind turbines mounted on a floating support structure anchored to the seabed which provides wind turbine stability so that the plane of the blades remains in an optimum position for supplying power, under the best conditions.

Description of the Prior Art

Various floating support structures intended for installation offshore multi-megawatt wind turbines are under development in many countries. Depending on the depth of the site considered, several design options are possible. Despite their great diversity, three main floating support families emerge according to the nature of the hydrostatic righting moment used. The following can be mentioned:

SPAR type floaters which are characterized by a slender geometric shape and comprising significant ballast to lower the center of gravity of the whole structure to the maximum in order to provide stability;

TLP (Tension Leg Platform) type support structures that have the specific feature of being anchored to the seabed by taut cables providing structure stability; and Semi-submersible floaters that have a great waterplane moment of inertia, providing sufficient righting moment for the stability thereof.

In terms of hydrostatic righting, barge type floaters are to be classified among the semi-submersible platforms due to their great waterplane area but they however differ therefrom in their much more compact aspect.

However, in the field of offshore wind turbines, which have in particular high slenderness ratios, conventional floating support structures are not always suited to the operating constraints of the rotor. Offshore wind turbines are sensitive, on the one hand, to the inclination of their rotation axis and, on the other hand, to the high accelerations of the nacelle. All the work on the design of the floating support structures thus is to meet at least the above two constraints while avoiding prohibitive costs.

SUMMARY OF THE INVENTION

The present invention relates to a floating offshore wind turbine comprising:

a main floater comprising a part of substantially cylindrical shape;

a concrete circular element of diameter Dd greater than diameter Dc of the main floater, providing a stationary mass at the base of the floater and a damper;

a supplementary permanent ballast arranged at the base of the main floater; and dynamic ballast boxes included in the main floater and distributed on the periphery of the floater.

According to the invention, the diameter Dc/draft ratio can range between 1.3 and 1.

The outside diameter Dd of a skirt, which is a damping plate, can range between 1.5 and 2 times the diameter Dc of the floater, and it is preferably close to 1.75.

The skirt can have a decreasing thickness towards the outside diameter thereof.

The permanent ballast at the base of the main floater can be concrete, or water, or a combination of water and concrete.

A funicular anchor system can hold the wind turbine in place.

The floating offshore wind turbine can have horizontal-axis blades or vertical-axis blades.

BRIEF DESCRIPTION OF THE FIGURES

Other features and advantages of the present invention will be clear from reading the description hereafter of a preferred embodiment given by way of non-limitative example, with reference to the accompanying figures wherein.

DETAILED DESCRIPTION

Figure 1:
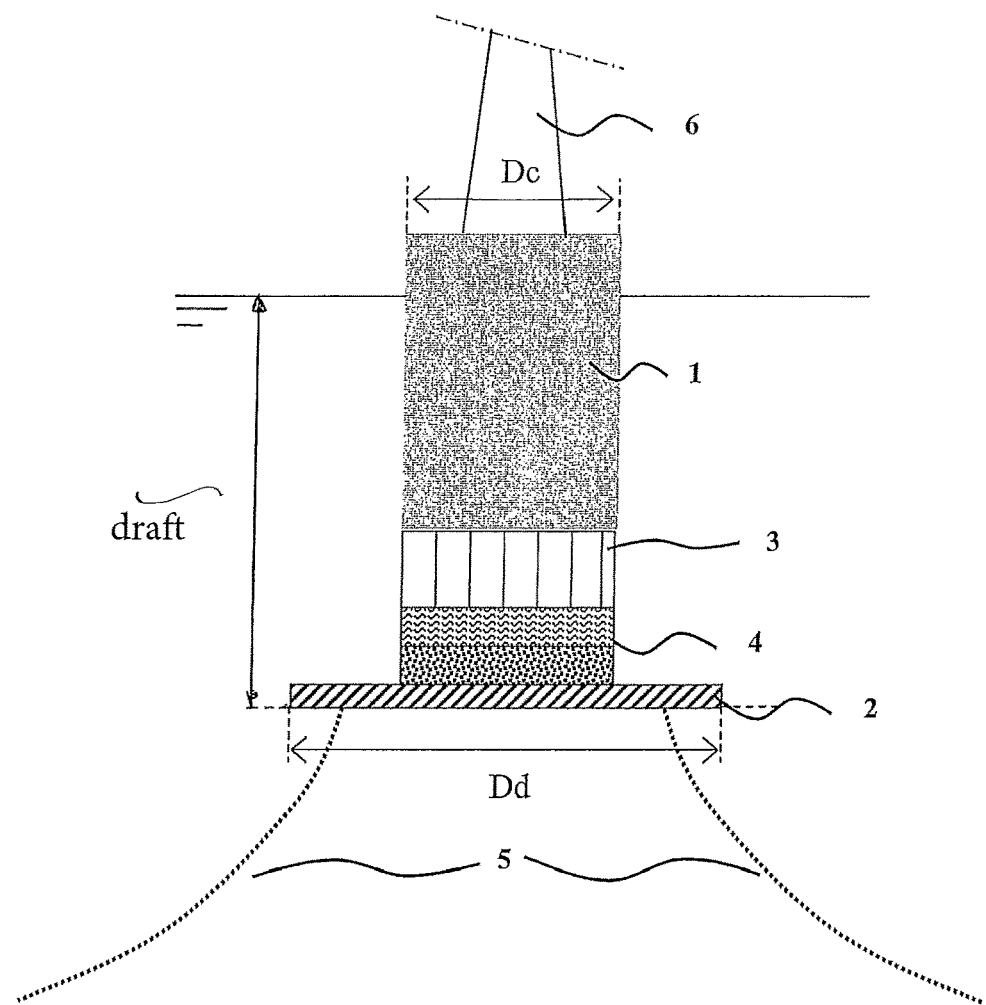
FIG. 1 schematically shows the wind turbine assembly on its floating support structure.

In FIG. 1, the floating support structure is made up of a main floater 1 comprising at least a part of cylindrical (circular) geometry to which a damping plate 2, also referred to the "skirt", is added in the lower part. The combination of the various ballasts which are permanent and dynamic is contained in this cylindrical part. The "draft" as shown in FIG. 1 extends from the waterline to the bottom of the plate 2. The upper part of the main floater can have other outer shapes, such as conical, cylindrical with a different diameter, suited to hydrodynamic flows. A permanent ballast 4, necessary for hydrostatic balance control, is arranged in the bottom of the floater and it can be made of concrete, sea water, or any weighty solid or liquid material. The masses of these various materials are so distributed to meet both the static and dynamic stability criteria, and to minimize the manufacturing costs. Several compartments 3, whose volumes can be ballasted or unballasted depending on the operating conditions of wind turbine 6, are arranged above the permanent ballast 4 and on the periphery of main floater 1 within the cylinder. The aerodynamic thrust linked with the operation of the wind turbine modifies the trim angle of the platform. Ballasts 3 allows correction and adjustment of the trim angle and therefore the axis of the wind turbine. The platform is equipped with pipes and pumps allowing an amount of liquid to be transferred to the various volumes. The total volume of liquid is generally maintained constant.

The dimensions of the main floater are such that the ratio of diameter Dc/draft remains within the 1.3-1 range, which is far from the slender shape of the SPAR buoys.

The wind turbine, whether with a horizontal axis (Horizontal Axis Wind Turbine HAWT) or a vertical axis (Vertical Axis Wind Turbine VAWT), generates a horizontal thrust induced by the wind, accompanied by drag forces on the nacelle and the tower of the wind turbine. These forces tend to cause the floating structure to tilt which is referred to as trim angle change. The variations in the trim angle of the support structure can be reduced by modifying the distribution of the liquid in the ballasts. Thus, the wind turbine operates in an optimum manner and any risk of fatigue of the various mechanical components is avoided.

To a first approximation, dimensioning of a platform supporting a wind turbine needs to meet two main constraints, which are:

a sufficiently immersed volume for bearing the weight of the wind turbine, of its anchor system and its own weight; and a sufficient righting moment to control the possible maximum aerodynamic thrust force of the wind turbine being considered.

Considering low-rotation displacements, these two constraints can be expressed mathematically with the following relations:

$$\begin{cases} \rho \forall = M_{tot} \\ F_T \cdot (H_{hub} + Z_{CG}) = \left( \rho \forall g Z_{CB} - M_{tot} g Z_{CG} + \rho g \pi \frac{D_c^4}{8} + C_{55,lignes} \right) \cdot \theta \end{cases}$$

with:
p being density of the water (Kg/m³),
g being gravity (m/s²),
$M_{tot}$ being total mass of the structure (Kg),
∀ being immersed volume (m³),
$F_t$ being aerodynamic thrust force at the hub (N),
$H_{hub}$ being altitude of the hub (m),
$Z_{CG}$ being vertical position of the center of gravity of the whole structure (m),
$Z_B$ being center of flotation (m),
$D_c$ being diameter of the floater (m),
$D_d$ being diameter of the skirts (m),
$C_{55,\ lignes}$ being pitch stiffness associated with mooring (N·m/rad), and
Θ being trim angle (rad).

Figure 2:
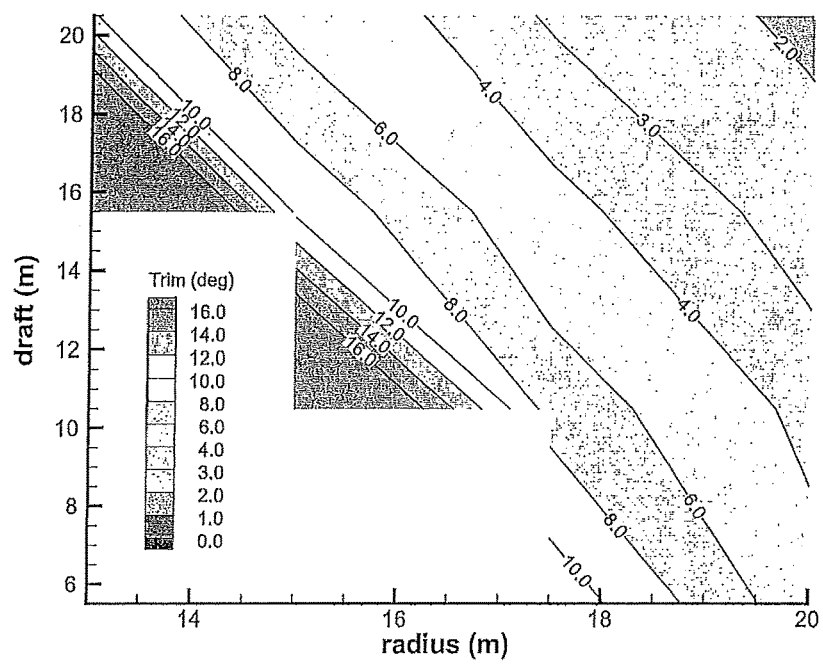
FIG. 2 shows the evolution of the trim of a floating support structure of cylindrical shape as a function of its radius and of its draft.

FIG. 2 shows the evolution of the trim angle of a cylindrical floating support structure as a function of its radius and of its draft when it is subjected to the moment associated with the maximum thrust of a 5-MW horizontal-axis wind turbine. The white zones correspond to the configurations where the floating support structure is not stable. This type of result thus permits accounting for the different possible configurations according to the desired trim angle.

The purpose of adding skirts is to shift the resonance period of heave, or vertical oscillatory movement, of the floating support structure outside the predominant swell periods (these swell periods are generally contained in a spectrum from 3 s to 20 s) where the wave energy is mainly concentrated, so as to reduce the amplitudes of the vertical displacements of the structure and thus to provide optimum operating conditions for the wind turbine rotor. In the case of a cylindrical floater and two circular skirts, the resonance period of heave can be calculated by the following relation:

$$T_Z = 2\pi \sqrt{\frac{M_{tot} + m_{add}(\infty)}{K_{HZ}}}$$

that relates the resonance period in heave $T_z$ to the total mass $M_{tot}$ of the structure (mooring, wind turbine, floater), to the associated added water mass for infinite frequency $M_{add}(\infty)$ and to the hydrostatic stiffness heave $K_{HZ}$, with:

$$\begin{cases} K_{HZ} = \rho \pi \frac{D_c^2}{4} \\ m_{add}(\infty) = \frac{1}{3} \rho D_d^3 \end{cases}$$

with $D_d$ the diameter of the "skirt".

Figure 3:
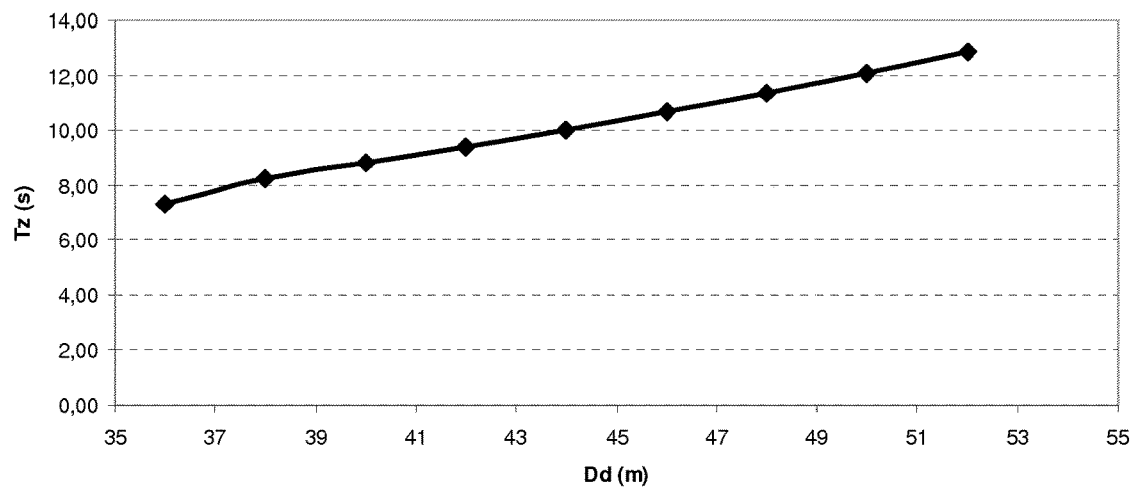
FIG. 3 shows the influence of diameter Dd on the resonance frequency of heave.

A parametric study thus assessed the influence of the diameter of the damping plate ("skirt") on the resonance period of heave (FIG. 3).

These results first show that adding a damping plate markedly improves the performances of a barge type platform. It can be noted that pertinent selection of the main dimensioning parameters of the floater and of the skirts allows efficiently shifting the resonance period of heave outside the predominant swell periods.

Figure 4:
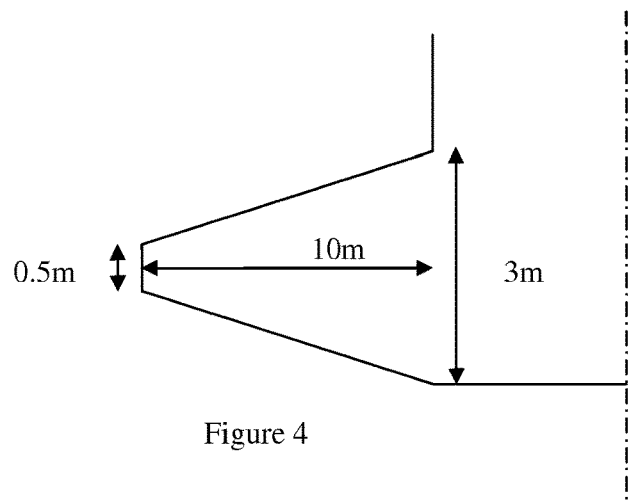
FIG. 4 schematically shows a cross-sectional view of geometry of the "skirt"

The main purpose of the skirt is to shift the eigenfrequencies of heave as explained above. Furthermore, in order to improve the stability of the floater, using the skirt as a permanent ballast volume is a very interesting construction. Indeed, the skirt is located at the lower end of the floater and its volume can be potentially great, considering notably its large outside diameter. The present invention adds a permanent ballast function to the "skirt" element. Its shape is preferably conical. The thickness on the outside diameter is decreased in order not to have a negative hydrodynamic effect, notably for the eigenfrequency shift. On the inside diameter, the thickness is significantly increased to allow the highest possible ballast mass. Hydrodynamic studies have shown that the maximum thickness on the outside diameter is preferably about 0.5 m and that a cone angle of the order of 7.5° remains acceptable. By taking account of these constraints, the preferred skirt geometry is for example as shown in FIG. 4.

The strength of the concrete skirt has been checked under a pressure representative of the hydrodynamic pressure exerted when the floater undergoes heave movements in the presence of a North Atlantic five-year wave with a swell peak period close to the resonance period of heave. The skirt can be made from other materials if necessary, or it can be partly filled with concrete and another material, solid or liquid. Studies have allowed estimation of the hydrodynamic stresses on the skirt. From this input data, a finite-element calculation has been carried out on Abaqus to check the mechanical strength of this concrete structure. The results regarding stresses in the concrete structure are assumed to have no steel reinforcement (the possible armatures will tend to reduce the stresses in the concrete), show that the maximum Von Mises stress is far below 5 MPa, and the tensile stress S11 is 2.4 MPa at the maximum. These values show that the concrete remains within the elastic domain under traction as well as compression. Its mechanical strength is therefore ensured under the assessed hydrodynamic pressure stresses.

The permanent supplementary ballast can be concrete, water or any other solid or liquid material, or of a combination thereof. The mean density of the permanent ballast must be sufficient to provide hydrostatic stability of the floating support structure considering the working volume of the platform (volume of the main floater+ volume of the dynamic ballast).

Using a combination of materials, concrete+ water for example, allows taking advantage of the density of the concrete while reducing the costs. The distribution of the two materials has an impact on the amount of necessary dynamic ballast and on the pitch period of the support structure. Indeed, any change in the concrete/water distribution modifies the center of gravity of the support on the one hand and its inertia on the other.

Figures 5A, 5B, 5C:
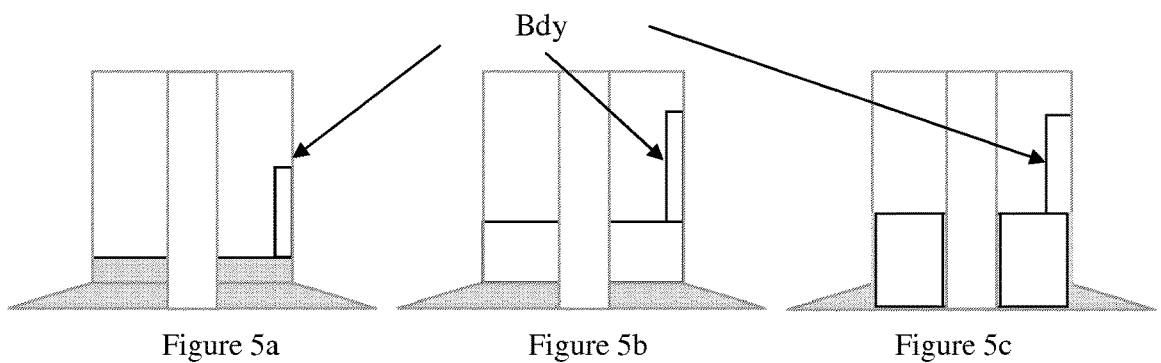
FIGS. 5a, 5b and 5c show three examples of makeup of the permanent ballast and of the dynamic ballast boxes.

In the example below (FIGS. 5a, 5b, 5c), cases are concluded where the permanent supplementary ballast is concrete only (case 1), and of two combinations of concrete and water (case 2 and case 3). In all these cases, the skirt is made of concrete.

In case 5a, the ballast is entirely made of a solid material such as concrete. In case 5b, part of the concrete has been replaced by a permanent ballast made of a liquid such as sea water. Finally, in case 5c, minimization of the concrete mass was sought while preserving its structural integrity. In these figures, the ballast boxes are arranged above the permanent ballast but configurations where the ballast boxes are positioned lower are possible.

The table below shows the influence of the distribution of the permanent ballast on the dynamic ballast and the pitch eigenperiod.

|  | Case 5a | Case 5b | Case 5c |
| --- | --- | --- | --- |
| Mass of water in the ballast boxes | 375 t | 460 t | 605 t |
| Pitch eigenperiod | 28 s | 32 s | 40 s |

Figures 6A, 6B:
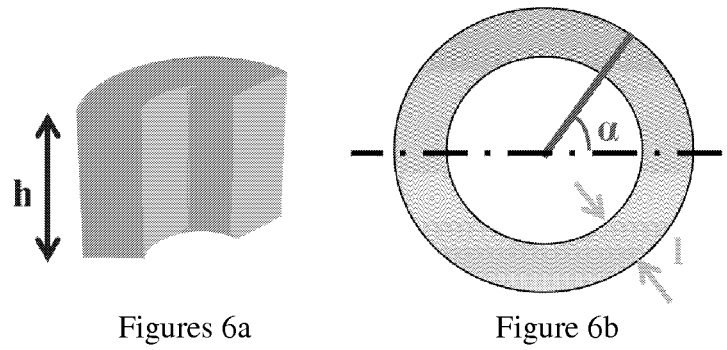
FIGS. 6a and 6b illustrate the ballast boxes.

The dynamic ballast under consideration fills tanks 3 arranged on the periphery of the floating support structure with a liquid. The dimensioning parameters are an angle α defining the angular distribution of the ballast compartments on either side of the thrust axis, and a tank width denoted by l and a filling height h (FIGS. 6a and 6b).

Figure 7:
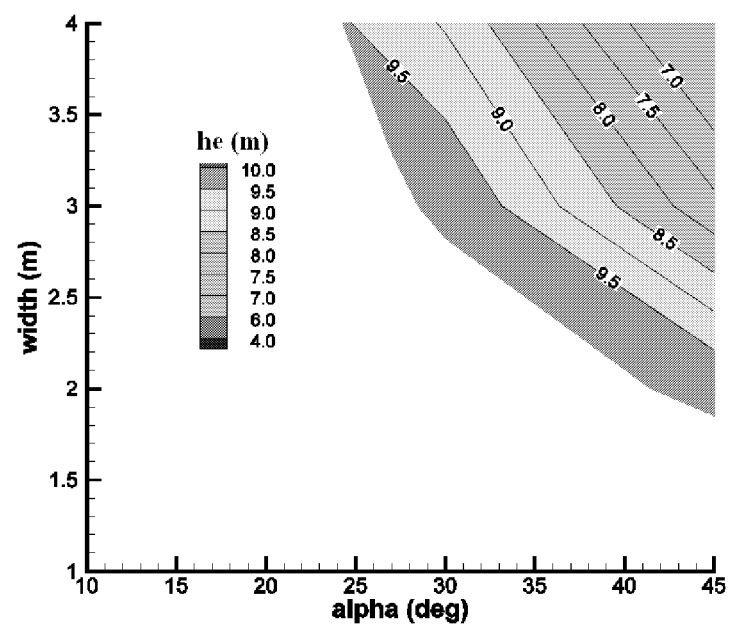
FIG. 7 illustrates the geometry of the ballast boxes for a target trim angle of 5°.

With a fixed main floater and skirt geometry (radius 13 m, draft 20.5 m), a parametric study was performed in order to know what height of water is necessary to reach a target trim angle according to the angular distribution a and the tank width l. FIG. 7 thus shows the height of water he required to obtain a trim angle of 5° in the presence of an 80-ton aerodynamic thrust force at the center of the rotor at 90 m height for tanks widths l ranging between 1 and 4 m, and an angle α ranging between 10 and 45°. The best configuration can thus be selected according to the chosen criteria (volume of liquid, metacentric height, etc.).

These results show that a HAWT or VAWT wind turbine mounted on a floating support structure such as the one of the present invention can be maintained sufficiently stable provided that the main dimensioning parameters have been specifically selected. On the other hand, the dynamic ballast arranged in combination in the main floater can be maintained with a correct trim for optimum energy recovery.

The combination of a skirt of optimized dimension made of a weighty material such as concrete or an equivalent material, of a permanent ballast allowing to adjust the weighty total mass at the base of the floater according to the wind turbine and to the environmental conditions, and of a dynamic ballast for controlling the trim angle of the wind turbine affords many advantages, both technical and economic, and proves perfectly suited to a floating support structure carrying a high-power wind turbine.

The mooring of this floating support structure can be 3 catenary anchor lines 5 distributed at 120°. Each line has a chain attached to two attachment points of the anchor lines (fairleads) on the floating support structure by using a Y-connection or crowfoot. This type of connection allows providing yaw stiffness, which is intrinsically low with this type of support.

Furthermore, the anchor line attachment points are arranged at the freeboard of the support and not, as it is often the case, at the draft. This provides pitch stiffness and reduction of the trim of the floating support structure under the effect of the thrust on the turbine. On the other hand, the pitch motion can be intensified under certain environmental conditions. A comprise has to be found between the gain in trim and the maximum pitch that can be allowed depending on the operating conditions.

Each line can also be equipped with an additional point mass having two major advantages which are first avoiding compressive stresses over the entire chain length, and second providing additional yaw stiffness and reduction of the yaw/roll coupling that is sometimes observed on cylindrical supports.

The invention claimed is:

1. A floating offshore wind turbine for generating electricity comprising:
   a main floater of cylindrical shape which floats in offshore water during the generation of electricity;
   a conical concrete damping plate attached to the main floater, which floats in the water during the generation of electricity, having a diameter greater than a diameter of the main floater and a thickness of the conical concrete damping plate decreasing from a center thereof towards an outside perimeter;
   a stationary mass located at a base of the main floater and the conical concrete damping plate is elastic under traction and compression when floating;
   a floating supplementary permanent ballast located at the base of the main floater; and
   dynamic ballast boxes within the main floater which are distributed on a periphery of the floater; and wherein
   the conical concrete damping plate has a thickness at a periphery thereof that is less than 0.5 m, an angle is defined by a conical surface of the conical concrete damping plate which is less than 7.5 degrees, and a diameter of the conical concrete damping plate is larger than a diameter of the main floater.

2. A floating offshore wind turbine as claimed in claim 1, wherein a ratio of a diameter of the main floater to draft of the concrete circular element ranges between 1.3 and 1.

3. A floating offshore wind turbine as claimed in claim 1, wherein an outside diameter of the circular element ranges between 1.5 and 2 times a diameter of the floater.

4. A floating offshore wind turbine as claimed in claim 2, wherein an outside diameter of the circular element ranges between 1.5 and 2 times the diameter of the floater.

5. A floating offshore wind turbine as claimed in claim 1, comprising a permanent ballast disposed at a base of the main floater which includes at least one of concrete and water.

6. A floating offshore wind turbine as claimed in claim 2, comprising a permanent ballast disposed at a base of the main floater which includes at least one of concrete and water.

7. A floating offshore wind turbine as claimed in claim 3, comprising a permanent ballast disposed at a base of the main floater which includes at least one of concrete and water.

8. A floating offshore wind turbine as claimed in claim 4, comprising a permanent ballast disposed at a base of the main floater which includes at least one of concrete and water.

9. A floating offshore wind turbine as claimed in claim 1, comprising a funicular anchor system for holding the wind turbine in place.

10. A floating offshore wind turbine as claimed in claim 2, comprising a funicular anchor system for holding the wind turbine in place.

11. A floating offshore wind turbine as claimed in claim 3, comprising a funicular anchor system for holding the wind turbine in place.

12. A floating offshore wind turbine as claimed in claim 4, comprising a funicular anchor system for holding the wind turbine in place.

13. A floating offshore wind turbine as claimed in claim 1, wherein an axis of blades of the turbine is horizontal.

14. A floating offshore wind turbine as claimed in claim 2, wherein an axis of blades of the turbine is horizontal.

15. A floating offshore wind turbine as claimed in claim 3, wherein an axis of blades of the turbine is horizontal.

16. A floating offshore wind turbine as claimed in claim 4, wherein an axis of blades of the turbine is horizontal.

17. A floating offshore wind turbine as claimed in claim 5, wherein an axis of blades of the turbine is horizontal.

18. A floating offshore wind turbine as claimed in claim 1, wherein an axis of blades of the turbine is vertical.

19. A floating offshore wind turbine as claimed in claim 2, wherein an axis of blades of the turbine is vertical.

20. A floating offshore wind turbine as claimed in claim 3, wherein an axis of blades of the turbine is vertical.

21. A floating offshore wind turbine as claimed in claim 4, wherein an axis of blades of the turbine is vertical.

22. A floating offshore wind turbine as claimed in claim 5, wherein an axis of blades of the turbine is vertical.

\* \* \* \* \*